United States Patent [19]

Aagano et al.

[11] Patent Number: 4,573,159
[45] Date of Patent: Feb. 25, 1986

[54] TEMPERATURE-CONTROLLED LASER APPARATUS

[75] Inventors: Toshitaka Aagano; Yoshimi Takasaki, both of Kaisei, Japan

[73] Assignee: Fuji Photo Film Co., Ltd., Minami-ashigara, Japan

[21] Appl. No.: 630,198

[22] Filed: Jul. 12, 1984

[30] Foreign Application Priority Data

Jul. 15, 1983 [JP] Japan ................. 58-128770

[51] Int. Cl.⁴ ............................................. H01S 3/04
[52] U.S. Cl. ........................................ 372/34; 372/58; 372/65; 372/38
[58] Field of Search ................. 372/55, 34, 58, 65, 372/107, 38, 98

[56] References Cited

U.S. PATENT DOCUMENTS 4,387,462 6/1983 Markus ................................. 372/34

FOREIGN PATENT DOCUMENTS 0060631 9/1982 European Pat. Off. ............. 372/34

Primary Examiner—William L. Sikes
Assistant Examiner—Léon Scott, Jr.
Attorney, Agent, or Firm—Fleit, Jacobson, Cohn & Price

[57] ABSTRACT

A laser apparatus comprises a laser tube supported by a plurality of mounts on a supporting plate, a case housing the laser tube, temperature sensors positioned on the mounts or the supporting plate near the mounts or the laser tube, and a plurality of fans positioned on a wall of the case. The fans are positioned to generate air streams passing over the respective sections the temperatures of which are detected by the temperature sensors and operated in accordance with electric outputs of the temperature sensors, thereby maintaining the temperatures at the respective sections at a predetermined level.

4 Claims, 4 Drawing Figures

TEMPERATURE-CONTROLLED LASER APPARATUS

BACKGROUND OF THE INVENTION

1. Field of the Invention

This invention relates to a temperature-controlled laser apparatus comprising a laser tube. This invention particularly relates to an external mirror type temperature-controlled laser apparatus.

2. Description of the Prior Art

Laser apparatuses comprising a laser tube are widely used in measuring instruments, analyzers, communication apparatuses, image read-out apparatuses, holographic apparatuses, welding apparatuses, medical apparatuses such as laser scalpels, nuclear fusion apparatuses, and the like.

One known type of laser apparatuses is the gas laser apparatuses. As gas laser apparatuses, there have heretofore been used external mirror type laser apparatuses wherein a pair of external mirrors for oscillating a laser beam are positioned independently from a cylindrical laser tube in the axial direction of the laser tube.

In the external mirror type laser apparatus, the external mirrors and mounts for supporting the laser tube for emitting a laser beam are installed on the same supporting plate. In this configuration, when a voltage is applied to the laser tube to cause it to emit a laser beam, much heat is generated by the center portion of the laser tube. The heat generated by the center portion of the laser tube is transmitted to the supporting plate via the mounts of the laser tube and by heat convection and heat radiation. Since the center portion of the laser tube generates the most heat, a difference in temperature arises between the center portion of the supporting plate above which the center portion of the laser tube is positioned and the peripheral portions of the supporting plate on which the external mirrors are positioned. In this case, among the mounts, the temperature of the mount supporting the center portion of the laser tube becomes the highest, and the temperatures of the mounts supporting the end portions of the laser tube become the lowest. As a result, in the supporting plate, a change in the temperature gradient arises such that the temperature of the portion of the supporting plate contacted with the mount supporting the center portion of the laser tube is higher than those of the portions of the supporting plate contacted with the mounts supporting the end portions of the laser tube. When this change in the temperature gradient arises in the supporting plate, the external mirrors are made to deviate in position with respect to the axial direction of the laser tube due to a difference in thermal expansion of the supporting plate. As a result, the intensity of the laser beam generated by the laser apparatus becomes low and, in the worst case, laser oscillation is not achieved. In order to eliminate this problem, adjustments of the positions of the external mirrors have heretofore been conducted periodically, for example, monthly. However, it is very troublesome to correct the positions of the external mirrors. Also, this method is not a one which prevents the external mirrors from deviating in position due to change in the temperature gradient arising in the supporting plate during the use of the laser apparatus.

SUMMARY OF THE INVENTION

The primary object of the present invention is to provide an external mirror type temperature-controlled laser apparatus which prevents the external mirrors from deviating in position due to nonuniform temperature increase arising during the use of the laser apparatus.

Another object of the present invention is to provide an external mirror type temperature-controlled laser apparatus which almost permanently eliminates the necessity of adjusting the positions of the external mirrors.

The specific object of the present invention is to provide an external mirror type temperature-controlled laser apparatus which improves the stability of the power and direction of the emitted laser beam.

The temperature-controlled laser apparatus in accordance with the present invention is provided with a laser tube supported by a plurality of mounts on a supporting plate, a case housing said laser tube, a plurality of temperature sensors positioned on said mounts, on said supporting plate near said laser or said laser tube for detecting the temperatures of said mounts or said supporting plate near said mounts or said laser tube, and a plurality of ventilation means positioned on said case, wherein the improvement comprises positioning said ventilation means to generate air streams passing over respective sections the temperature of which are detected by said temperature sensors or near said respective sections, and operating said ventilation means in accordance with outputs of said temperature sensors, thereby maintaining the temperatures at said respective sections at a predetermined level In the present invention, it is possible to prevent the temperature of the mounts supporting the laser tube or of the supporting plate to which the mounts are secured from becoming different among the laser tube supporting positions when the laser tube generates more heat at the center portion than at end portions during the use of the laser apparatus. Temperatures at the laser tube supporting positions are detected by a plurality of temperature sensors installed on the laser tube, the mounts or the supporting plate near the mounts. When the temperature at one of the laser tube supporting positions becomes higher than a predetermined value, the ventilation means corresponding to that laser tube supporting position is activated to generate an air stream passing over that position in an amount corresponding to the extent that the temperature exceeds the predetermined value. In this manner, it is possible to decrease the temperature to the predetermined value, and maintain the temperatures at the respective laser tube supporting positions at the predetermined level. Therefore, when the laser apparatus is used, it is possible to eliminate any change in the temperature gradient arising on the supporting plate or maintain the temperature gradient at a predetermined value, and to prevent the supporting plate from being deformed due to a difference in thermal expansion among respective positions thereof. Consequently, it becomes possible to prevent the external mirrors from deviating in position with respect to the axial direction of the laser tube. Also, it becomes possible to use the laser apparatus semipermanently without conducting adjustments of the positions of the external mirrors. It is also possible to shorten the time required for eliminating any change in the temperature gradient on the supporting plate. Further, the laser apparatus of the present invention improves the stability of the power and direction of the emitted laser beam, and thus is very advantageous in practical use.

DESCRIPTION OF THE PREFERRED EMBODIMENTS

The present invention will hereinbelow be described in further detail with reference to the accompanying drawings.

Figure 1:
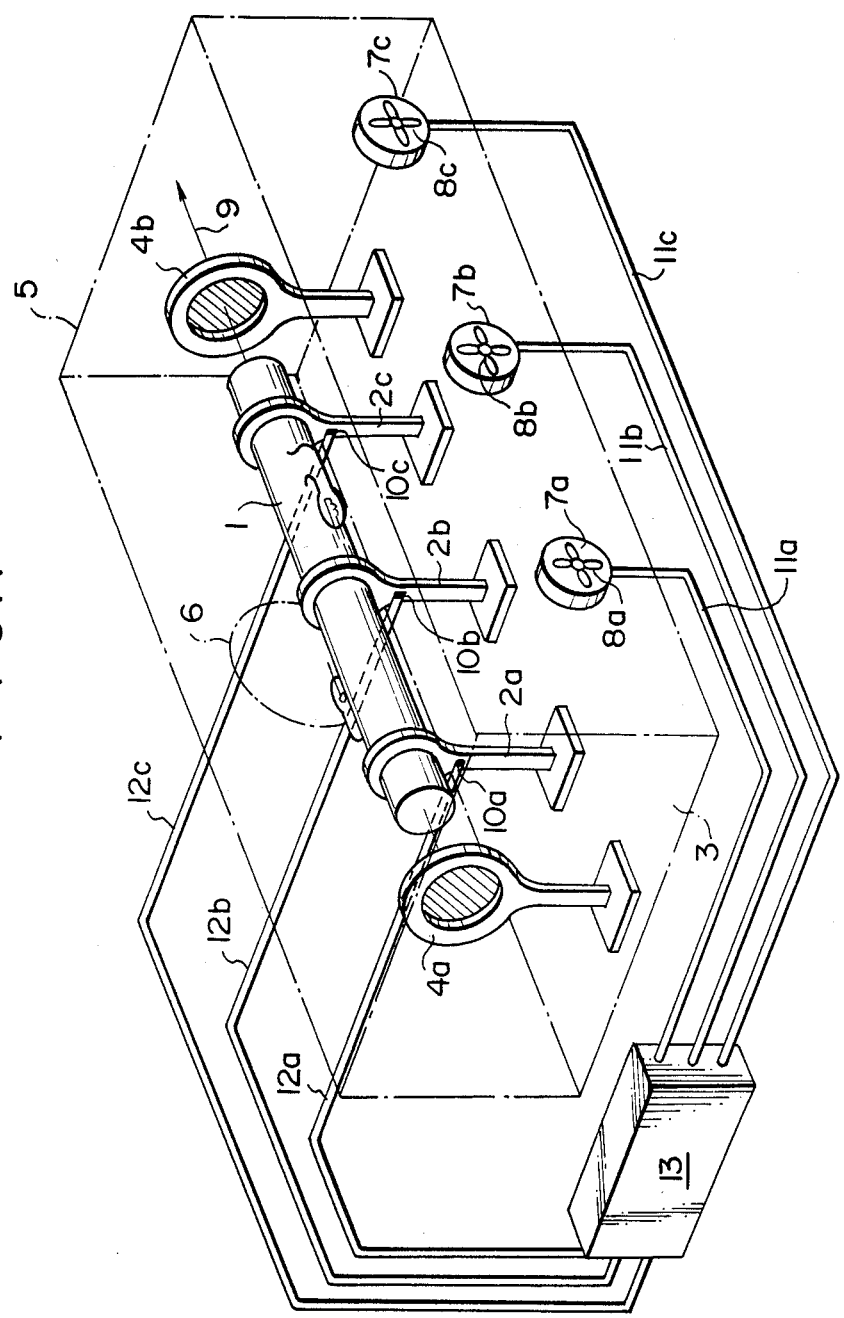
FIG. 1 is a schematic perspective view showing an embodiment of the temperature-controlled laser apparatus in accordance with the present invention.
Figure 2:
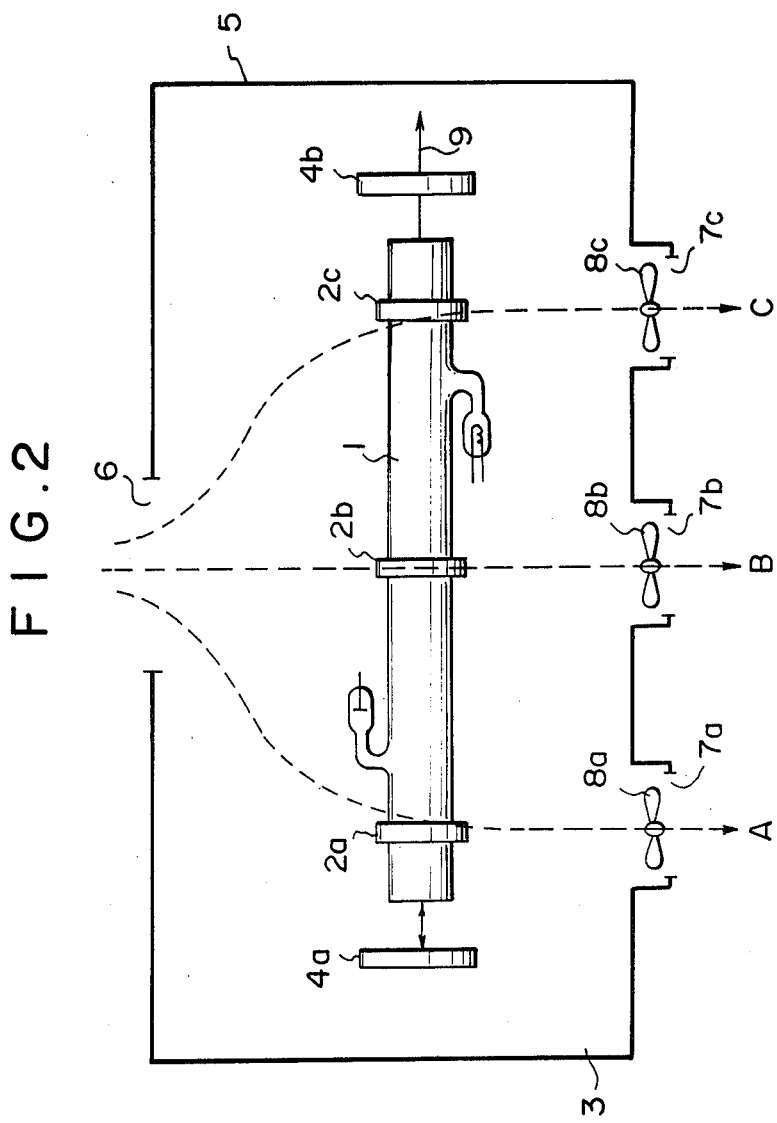
FIG. 2 is a plan view of FIG. 1.

Referring to FIGS. 1 and 2, a laser tube 1 is supported by mounts 2a, 2b and 2c on a supporting plate 3. A pair of external mirrors 4a and 4b for laser oscillation are installed on the supporting plate 3 at positions slightly spaced from both ends of the laser tube 1 in the axial direction thereof. The laser tube 1, the external mirrors 4a and 4b, and the supporting plate 3 are housed in a case 5. In a side wall of the case 5 is perforated an air stream inlet 6 for introducing air into the case 5 so that air introduced through the air stream inlet 6 impinges upon the center portion of the laser tube 1. On a side wall of the case 5 opposite to that provided with the air stream inlet 6 are installed air stream outlets 7a, 7b and 7c so that air introduced through the air stream inlet 6 passes over the mounts 2a, 2b and 2c of the laser tube 1 in the directions as indicated by the arrows A, B and C in FIG. 2 to the air stream outlets 7a, 7b and 7c. The air stream outlets 7a, 7b and 7c are provided with fans 8a, 8b and 8c for generating the air streams. On the mounts 2a, 2b and 2c supporting the laser tube 1 are installed thermistors 10a, 10b and 10c as temperature sensors for detecting the temperatures of the mounts 2a, 2b and 2c. The outputs of the thermistors 10a, 10b and 10c are fed through input lines 12a, 12b and 12c to a control circuit 13 positioned outside of the case 5. The control circuit 13 is also connected to the fans 8a, 8b and 8c via output lines 11a, 11b and 11c for sending out the signals for driving the fans 8a, 8b and 8c.

In the laser apparatus constructed as described above, when a voltage is applied to the laser tube 1 to cause it to emit a laser beam 9, the temperature of the laser tube 1 increases in such manner that the temperature of the center portion of the laser tube 1 is the highest and the temperatures of the end portions of the laser tube 1 are lower than that of the center portion thereof. As a result, the temperature of the mount 2b supporting near the center portion of the laser tube 1 becomes the highest, and the temperatures of the mounts 2a and 2c supporting near the end portions of the laser tube 1 become lower than that of the mount 2b. Further, heat generated by the laser tube 1 is transmitted to the supporting plate 3 via the mounts 2a, 2b and 2c, so that the temperature of the supporting plate 3 becomes the highest at the portion near the center mount 2b. When the operation of the laser tube 1 is continued in this condition, the temperature of the whole laser tube 1 increases with the temperature of the center portion thereof different from those of the end portions. Therefore, the temperature of the supporting plate 3 increases in such manner that the temperature of the center portion thereof is different from those of end portions. As a result, the supporting plate 3 is deformed due to a difference in thermal expansion, and the external mirrors 4a and 4b deviate in position.

However, in the embodiment of the present invention, the temperatures of the mounts 2a, 2b and 2c are detected by the thermistors 10a, 10b and 10c. When the temperature of one of the mounts 2a, 2b and 2c exceeds a predetermined value, the corresponding one of the fans 8a, 8b and 8c is rotated to decrease the temperature of the mount, thereby eliminating the difference in temperature among the mounts 2a, 2b and 2c. As a result, no differnce in temperature arises in the supporting plate 3 to which heat of the laser tube 1 is transmitted via the mounts 2a, 2b and 2c, and the supporting plate 3 is prevented from deformation. Specifically, the temperature of the center mount 2b tends to become higher than those of the mounts 2a and 2c. When the temperature of the mount 2b exceeds a predetermined value, the fan 8b is rotated to generate an air stream flowing from the air stream inlet 6 to the air stream outlet 7b via the mount 2b as indicated by the arrow B in FIG. 2, thereby decreasing the temperature of the mount 2b.

Figure 3:
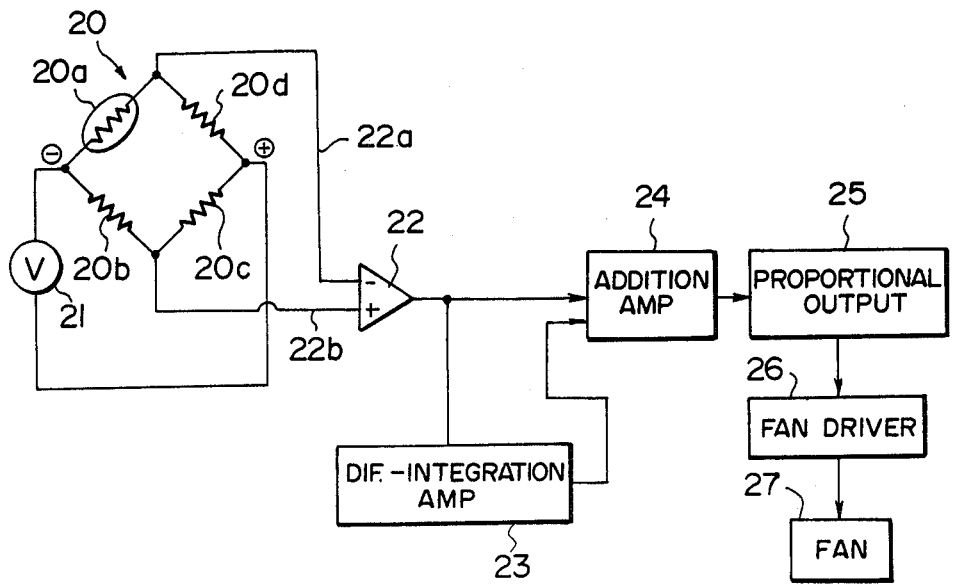
FIG. 3 is a circuit diagram showing the system for driving the fans of the apparatus of the present invention.

In this manner, the temperature distribution of the supporting plate 3 and that among the mounts 2a, 2b and 2c are made uniform. FIG 3 shown an example of the circuit configuration for driving the fans 8a, 8b and 8c when the temperatures detected by the thermistors 10a, 10b and 10c exceed a predetermined value. The circuit configuration comprises one thermistor and one fan drive system corresponding to the thermistor (for example, the thermistor 10a and the fan 8a). In the case of the embodiment of FIG. 1, three circuit systems as shown in FIG. 3 are necessary.

In FIG. 3, a predetermined voltage of a power source 21 is applied across two opposite terminals of a bridge circuit 20 consisting of fixed resistors 20b, 20c and 20d and a thermistor 20a. The remaining two terminals are connected to a differential amplifier 22 via lines 22a and 22b. The resistances of the fixed resistors 20b, 20c and 20d are adjusted so that, when the temperature detected by the thermistor 20a is equal to a predetermined value, for example, 42° C., the potential on the line 22a and the potential on the line 22b are equal to each other. Therefore, when the temperature detected by the thermistor 20a is lower than the predetermined value, the resistance of the thermistor 20a increases, and the potential on the line 22a which is input to the "−" of the differential amplifier 22 becomes high. As a result, the output of the differential amplifier 22 becomes negative. On the other hand, when the temperature detected by the thermistor 20a is higher than the predetermined value, the resistance of the thermistor 20a decreases, and the potential on the line 22a becomes low. Therefore, the output of the differential amplifier 22 becomes positive. In this case, since the resistance of the thermistor 20a decreases as the temperature increases, the output of the differential amplifier 22 is negative when the temperature detected by the thermistor 20a is lower than the predetermined value, is equal to zero when the temperature detected thereby is equal to the predetermined value, and is positive when the temperature detected thereby is higher than the predetermined value. Also, the output of the differential amplifier 22 increases as the detected temperature increases. The output of the differential amplifier 22 is divided into two portions. One output portion is sent to an addition amplifier 24 via a differentiation-integration amplifier 23, and the other output portion is directly sent to the addition amplifier 24. The sum of the inputs added by the addition amplifier 24 is then sent to a proportional output circuit 25 which generates a signal for changing the rotation speed of a fan 27 in proportion to the output of the addition amplifier 24 and sends the signal to a fan driver 26. Upon receiving the signal from the proportional output circuit 25, the fan driver 26 rotates the fan 27 at a speed proportional to the output of the addition amplifier 24. The differentiation-integration amplifier 23 is used for conducting PID control. It adds an integral control action to a proportional control action to eliminate an offset in the proportional control action, and adds a differential control action to the proportional control action to improve the response characteristics when the rotation speed of the fan 27 is changed. In this manner, it is possible to maintain the fan 27 non-operating when the temperature detected by the thermistor 20a is equal to or lower than the predetermined value (i.e. when the output of the differential amplifier 22 is zero or negative) and to rotate the fan 27 in accordance with the extent and the speed of the increase of the detected temperature exceeding the predetermined value when the temperature detected by the thermistor 20a exceeds the predetermined value, thereby decreasing the temperature around the thermistor 20a. Accordingly, it is possible to maintain the temperature detected by the thermistor 20a nearly at the predetermined value. In the embodiment of FIG. 1, by activating the fans 7a, 7b and 7c in accordance with the temperatures detected by the thermistors 10a, 10b and 10c, it is possible to maintain the temperatures detected by the thermistors 10a, 10b and 10c at a predetermined value. When the temperatures detected by the thermistors 10a, 10b and 10c, i.e. those of the mounts 2a, 2b and 2c in FIG. 1, become equal to each other, the temperature distribution on the supporting plate 3 becomes uniform.

As described above, it becomes possible to maintain the temperature distribution on the supporting plate 3 nearly uniform or at a predetermined temperature gradient, and to prevent deviation in position of the external mirrors 4a and 4b caused by a difference in thermal expansion of the supporting plate 3.

In the present invention, the fans 8a, 8b and 8c may be started and stopped in a manner interlocked with the thermistors 10a, 10b and 10c, or the rotation speeds of the fans 8a, 8b and 8c may be controlled in accordance with the output levels of the thermistors 10a, 10b and 10c as shown in FIG. 3. Also, the temperature sensors are not limited to the thermistors, and may be installed on the laser tube 1 or the supporting plate 3. However, the positions of the fans 8a, 8b and 8c must be in conformity with the positions of the temperature sensors so that air streams for cooling the sections the temperatures of which are detected by the temperature sensors can be generated. Further, it is also possible to install a plurality of the air stream inlets.

Figure 4:
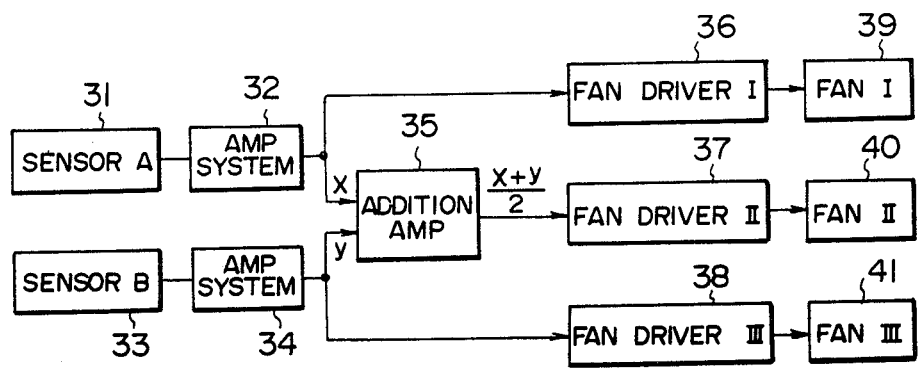
FIG. 4 is a block diagram showing the control system for controlling three fans by two temperature sensors in the apparatus of the present invention.

The fans and the temperature sensors need not be in one-to-one relation as in the aforesaid embodiment. For example, it is possible to use three fans for two temperature sensors. A control system for this case will hereinbelow be described with reference to FIG. 4. For simplicity of explanation, the degrees of effects of air streams (i.e. the cooling effects) of fans 39, 40 and 41 on temperatures sensors 31 and 33 are assumed to be such that the fan 39 has an effect only on the sensor 31, the fan 40 affects equally the sensors 31 and 33 (the degree of the effect is 50% on the sensor 31 and 50% on the sensor 33), and the fan 41 has an effect only on the sensor 33. A signal proportional to the temperature detected by the sensor 31 is generated by an amplifier system 32 of the type as described with reference to FIG. 3 and sent to a fan driver 36 and an addition amplifier 35. As a result, the rotation of the fan 39 is controlled by the fan driver 36 in proportion to the temperature detected by the sensor 31. On the other hand, a signal proportional to the temperature detected by the sensor 33 is generated by an amplifier system 34 and sent to the addition amplifier and a fan driver 38. Therefore, the rotation of the fan 41 is controlled by the fan driver 38 in accordance with the temperature detected by the sensor 33. Also, the addition amplifier 35 calculates an average value from the inputs sent from the amplifier systems 32 and 34 and sends a signal representing the average value to a fan driver 37. Therefore, the rotation of the fan 40 is controlled in accordance with the temperatures detected by the sensors 31 and 33. As described above, it is assumed that the fan 40 has equal cooling effects on the sensors 31 and 33. However, when the cooling effect of the fan 40 is different between the sensors 31 and 33, the inputs sent from the amplifier systems 32 and 34 should be weighted and then added. In this manner, temperature control can be achieved also when three fans are used for two temperature sensors. Namely, the temperature-controlled laser apparatus in accordance with the present invention can be realized by use of a plurality of temperature sensors and a plurality of fans not necessarily of like number.

From the viewpoint of the use of the laser apparatus, the rise time of the oscillation by the laser apparatus should be as short as possible. In order to shorten the rise time of the oscillation, the laser tube 1 and the mounts 2a, 2b and 2c should preferably be preheated to a certain temperature or higher. For this purpose, it is advantageous to install heaters in the case 5 or on the mounts 2a, 2b and 2c of the laser tube 1 or to provide the case 5 with a heat insulating material. In this case, since the rate of increase in temperature is lower at the end portions of the laser tube 1 than at the center portion thereof, it is advantageous that heaters having a larger capacity be installed at the end portions of the laser tube 1.

In the laser apparatus provided with the temperature control means in accordance with the present invention, when a voltage is applied to the laser tube 1 for generating a laser beam, slight deviation arises due to a difference in temperature between the positions of the external mirrors 4a, 4b at which the laser power becomes the maximum at the ambient temperature of the laser tube 1 immediately after the voltage is applied thereto and the positions of the external mirrors 4a, 4b at which the laser power becomes the maximum under the steady temperature-controlled conditions. In this case, by positioning the external mirrors 4a and 4b at the middles between the aforesaid positions slightly deviating from each other, it is possible to improve the laser power output characteristics at the beginning of the operation of the laser apparatus and to obtain a consistent high output also under steady conditions.

We claim:

1. A temperature-controlled laser apparatus provided with a laser tube supported by a plurality of mounts on a supporting plate, a case housing said laser tube, a plurality of temperature sensors positioned on said mounts, on said supporting plate near said mounts or on said laser tube for detecting the temperatures of said mounts or said supporting plate near said mounts or said laser tube, and a plurality of ventilation means positioned on said case, wherein the improvement comprises positioning said ventilation means to generate air streams passing over respective sections the temperatures of which are detected by said temperature sensors or near said respective sections, and operating said ventilation means in accordance with outputs of said temperature sensors, thereby maintaining the temperatures at said respective sections at a predetermined level.

2. An apparatus as defined in claim 1 wherein said temperature sensors are thermistors electrically connected to an input side of a control circuit system the output side of which is connected to said ventilation means.

3. An apparatus as defined in claim 2 wherein the rotation speeds of said ventilation means are controlled in proportion to the output levels of said thermistors.

4. An apparatus as defined in claim 1 further comprising a means for preheating said laser tube and said mounts before starting the operation of said laser apparatus.

* * * * *